(12) United States Patent
Barbee et al.

(10) Patent No.: US 8,000,286 B1
(45) Date of Patent: Aug. 16, 2011

(54) ALTERNATE OPERATIONAL-DATA TRANSMISSION SCHEME FOR LOW-COST-INTERNET-BASE-STATION- (LCIB) SYSTEMS

(75) Inventors: Bryan T. Barbee, Olathe, KS (US);
Timothy W. Sill, Platte City, MO (US);
Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 862 days.

(21) Appl. No.: 11/874,846

(22) Filed: Oct. 18, 2007

(51) Int. Cl.
*G01R 31/08* (2006.01)
*H04B 7/00* (2006.01)

(52) U.S. Cl. .......................... 370/328; 455/524

(58) Field of Classification Search ........................ None
See application file for complete search history.

(56) References Cited

U.S. PATENT DOCUMENTS

| | | | |
|---|---|---|---|
| 6,175,737 | B1 | 1/2001 | Kao |
| 2002/0067707 | A1 | 6/2002 | Morales et al. |
| 2004/0001439 | A1 | 1/2004 | Jones |
| 2004/0204097 | A1 | 10/2004 | Scheinert et al. |
| 2006/0111130 | A1* | 5/2006 | Lee et al. ........................ 455/466 |
| 2006/0203778 | A1* | 9/2006 | Han et al. ........................ 370/335 |
| 2006/0234747 | A1* | 10/2006 | Pan ................................ 455/519 |
| 2006/0258357 | A1* | 11/2006 | Bi et al. .......................... 455/437 |
| 2006/0262851 | A1 | 11/2006 | Bakfan et al. |
| 2007/0208864 | A1* | 9/2007 | Flynn et al. ..................... 709/227 |
| 2008/0008093 | A1* | 1/2008 | Wang et al. ...................... 370/235 |
| 2008/0032738 | A1* | 2/2008 | Boyer et al. .................... 455/556.1 |
| 2008/0043692 | A1* | 2/2008 | Morita ............................ 370/338 |
| 2008/0242290 | A1* | 10/2008 | Bhatia et al. ................... 455/422.1 |
| 2009/0029645 | A1* | 1/2009 | Leroudier ......................... 455/7 |

OTHER PUBLICATIONS

Non-final Office Action from U.S. Appl No. 11/283,565, mailed Feb. 22, 2008.
Final Office Action from U.S. Appl. No. 11/283,565, mailed Aug. 5, 2008.
Non-final Office Action from U.S. Appl. No. 11/283,565, mailed Dec. 16, 2008.
Final Office Action from U.S. Appl. No. 11/283,565, mailed May 27, 2009.
Bennet Wong, "Filing the Generation Gap with Software-Defined, Broadband Radio", CTI Where Datacom Meets Telecom, vol. 4, No. 9, uncovered at least as early as Jul. 2002.
"AirSite Backhaul Free Base Station", AirNet Communications Corporation, http://www.aircom.com/pr_airsite.htm, printed from the World Wide Web on Jun. 28, 2002.
Bennet Wong, "Eliminate the Backhaul Link", AirNet Communications Corporation, http://www.aircom.com/pn_feature.htm, printed from the World Wide Web on Jul. 1, 2002.
Bhanu Srinivas Valluri, "Spectral Efficient Technologies in 3G for Packet Access", http://www.techonline.com/community/ed_resource/feature_article/..., TechOnLine Publication Date Apr. 20, 2005.

(Continued)

*Primary Examiner* — Pankaj Kumar
*Assistant Examiner* — Eunsook Choi

(57) ABSTRACT

Methods and systems are provided for implementing an alternate operational-data transmission scheme for LCIB systems. According to an embodiment, an LCIB provides service to at least one mobile station on a first wireless network, the provision of service comprising (i) providing an air interface according to a first wireless technology, (ii) providing a backhaul connection over a packet-data network to a service-provider network, and (iii) bridging the air interface and the backhaul connection. The LCIB collects operational data, which the LCIB transmits to a server over a second wireless network according to a second wireless technology, where the second wireless network is different than the first wireless network, and the second wireless technology is different than the first wireless technology.

13 Claims, 4 Drawing Sheets

OTHER PUBLICATIONS

Unpublished U.S. Appl. No. 11/283,565, filed Nov. 18, 2005 entitled "Method and System for Wireless Backhaul Communication Between a Radio Access Network and a Remote Base Station".

Unpublished U.S. Appl. No. 12/537,740, filed Aug. 7, 2009 entitled "Methods and Systems for Using Femtocells to Address Macro-Network Backhaul Congestion".

* cited by examiner

ALTERNATE OPERATIONAL-DATA TRANSMISSION SCHEME FOR LOW-COST-INTERNET-BASE-STATION-(LCIB) SYSTEMS

BACKGROUND

1. Technical Field

The present invention relates to wireless networks, and, more particularly, to wireless networks that include one or more Low-Cost Internet Base Stations (LCIBs).

2. Description of Related Art a. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1 xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

b. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel. This other channel may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

SUMMARY

Methods and systems are provided for implementing an alternate operational-data transmission scheme for LCIB systems. In one aspect, an exemplary embodiment of the present invention may take the form of a method. In accordance with the method, an LCIB provides service to at least one mobile station on a first wireless network. Providing service on the first wireless network comprises (i) providing an air interface according to a first wireless technology, (ii) providing a backhaul connection over a packet-data network to a service-provider network, and (iii) bridging the air interface and the backhaul connection. The LCIB collects operational data; and transmits the operational data to a server over a second wireless network according to a second wireless technology, where the second wireless network is different than the first wireless network, and the second wireless technology is different than the first wireless technology.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
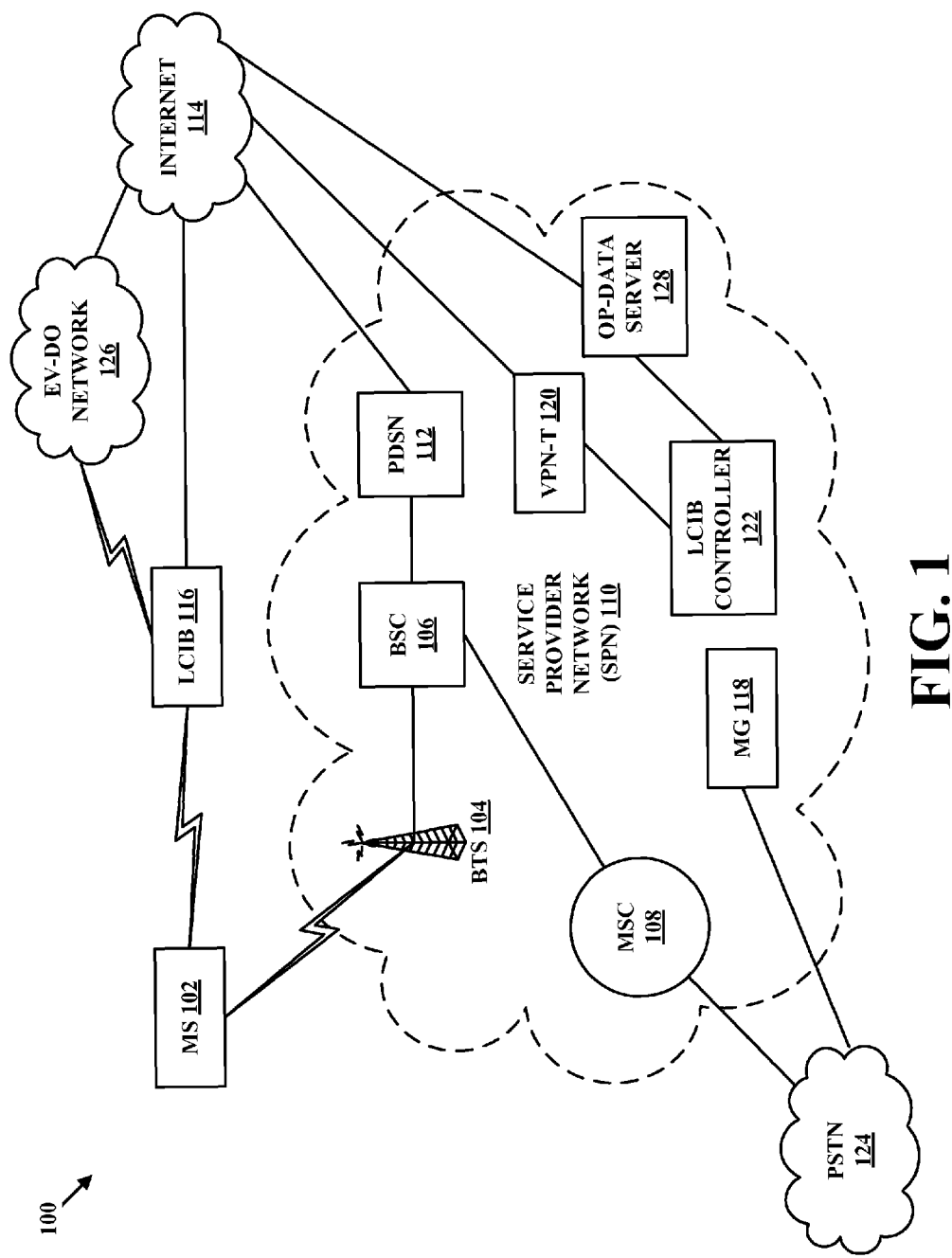
FIG. 1 is a simplified block diagram of a communication system, in accordance with exemplary embodiments.

LCIBs typically take and store many of the same operational measurements and records that macro base stations do. As examples, LCIBs may take and store measurements and/or records (together, "operational data") pertaining to dropped calls, blocked calls, data throughput, access quality, voice quality, auto-configuration parameters and/or results, and/or any other types of data. LCIBs are typically arranged to periodically (e.g. every thirty minutes) transmit this operational data, and/or averages, summaries, reports, etc. thereof, to an entity—such as an LCIB controller—on the provider's core packet network via the user's broadband connection.

This is undesirable for at least the reasons that it (i) uses uplink bandwidth—that may be needed for other LCIB operations, such as carrying calls, and/or other home-network or office-network communication—on the broadband connection and (ii) has the potential in the aggregate to overload the core network, which handles user-traffic and operational-data communications for a large number of LCIBs. This may cause service degradation, premature network upgrades at added expense, a need to disable operational-data collection, and/or other problems.

In accordance with the invention, the LCIB communicates with the core network via a wireless network other than the one on which the LCIB provides service. For example, the LCIB may provide service on a first (e.g. CDMA) wireless network, and transmit operational data to an entity (e.g. an operational-data server) on the core network or on another network via a second (e.g. EV-DO) wireless network. As such, the LCIB may have an EV-DO wireless interface (e.g. an EV-DO modem), and use that interface to transmit operational data to the operational-data server via a high-speed EV-DO connection. This relieves the burden on the service-provider's core-network elements, which handle user-traffic and other service-related signaling with many LCIBs. In accordance with the invention, the LCIB may transmit operational data via the second wireless network at a predetermined time (e.g. 3:00 a.m.) each day. And the LCIB may require acknowledgement from the operational-measurement server.

In some embodiments, the LCIB estimates the load on the second wireless network, and only attempts to transmit operational data when the second wireless network is lightly loaded. Where the second wireless network is an EV-DO network, this may involve checking what is known as the "reverse activity bit" (RAB), which is a value broadcast in a coverage area by an EV-DO access node to indicate that the load in the coverage area on a particular carrier is above (RAB=1) or below (RAB=0) a certain threshold. In general, higher data rates can be used, and thus more efficient transfer can occur, when the load on a sector/carrier is low. If the second wireless network is experiencing high load or is otherwise unavailable, the LCIB may store its operational data until the load or unavailability abates; or the LCIB may use its broadband connection, perhaps when the second wireless network is unavailable for an extended time. In the latter case, the LCIB still need not address the transmission to core-network elements.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, a public switched telephone network (PSTN) 124, an EV-DO network 126, and an operational-data server 128. And additional entities could be present, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106 and PSTN 124. In general, MSC 108 acts as a switch between PSTN 124 and one or more BSCs such as BSC 106, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s). And although EV-DO network 126 is depicted outside service-provider network 110, EV-DO network 126 may in some embodiments be considered part of service-provider network 110.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include (i) a first wireless interface for providing service to mobile stations according to a protocol such as CDMA (and/or one or more other technologies), (ii) a second wireless interface for communicating with a second wireless network such as EV-DO network 126, and (iii) an Ethernet or WiFi interface for communicating over Internet 114 via a device such as a router and/or cable modem. LCIB 116—also described in connection with FIG. 2—may also have a GPS receiver and/or other location module.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include both a circuit-switched interface and a packet-switched interface. MG 118 may (a) receive packet-based communications from SPN 110, convert those to circuit-switched communications, and pass them to PSTN 124 and (b) receive circuit-switched communications from PSTN 124, convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120 and operational-data server 128, along with perhaps one or more other entities on service-provider network 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

EV-DO network 126 may include one or more EV-DO access nodes, along with one or more PDSNs or similar entities that interface between the access nodes and Internet 114. EV-DO network 126 may provide an EV-DO air interface in compliance with one or more industry standards such as IS-856, Release 0 and IS-856, Revision a. EV-DO network 126 may provide EV-DO service to EV-DO access terminals, which may include mobile handsets, EV-DO modems for laptop computers, EV-DO modems internal to LCIBs, and/or any other types of EV-DO access terminals. Thus, each of these access terminals may be able to engage in packet-data communication over Internet 114 by establishing a session with EV-DO network 126.

Operational-data server 128 may be any networking element arranged to carry out the operational-data-server functions described herein. Thus, operational-data server 128 may include a communication interface, a processor, and data storage comprising instructions executable by the processor for carrying out those operational-data-server functions. The communication interface may include one or more wired and/or wireless interfaces for communicating with at least Internet 114 and LCIB controller 122, along with perhaps one or more other entities on service-provider network 110, and beyond. In general, operational-data server 128 functions to receive operational data over EV-DO network 126 and Internet 114 from one or more LCIBs, such as LCIB 116, and to organize and store that data, and perhaps produce reports, summaries, etc. for network administrators and/or one or more other network entities.

b. An Exemplary LCIB

Figure 2:
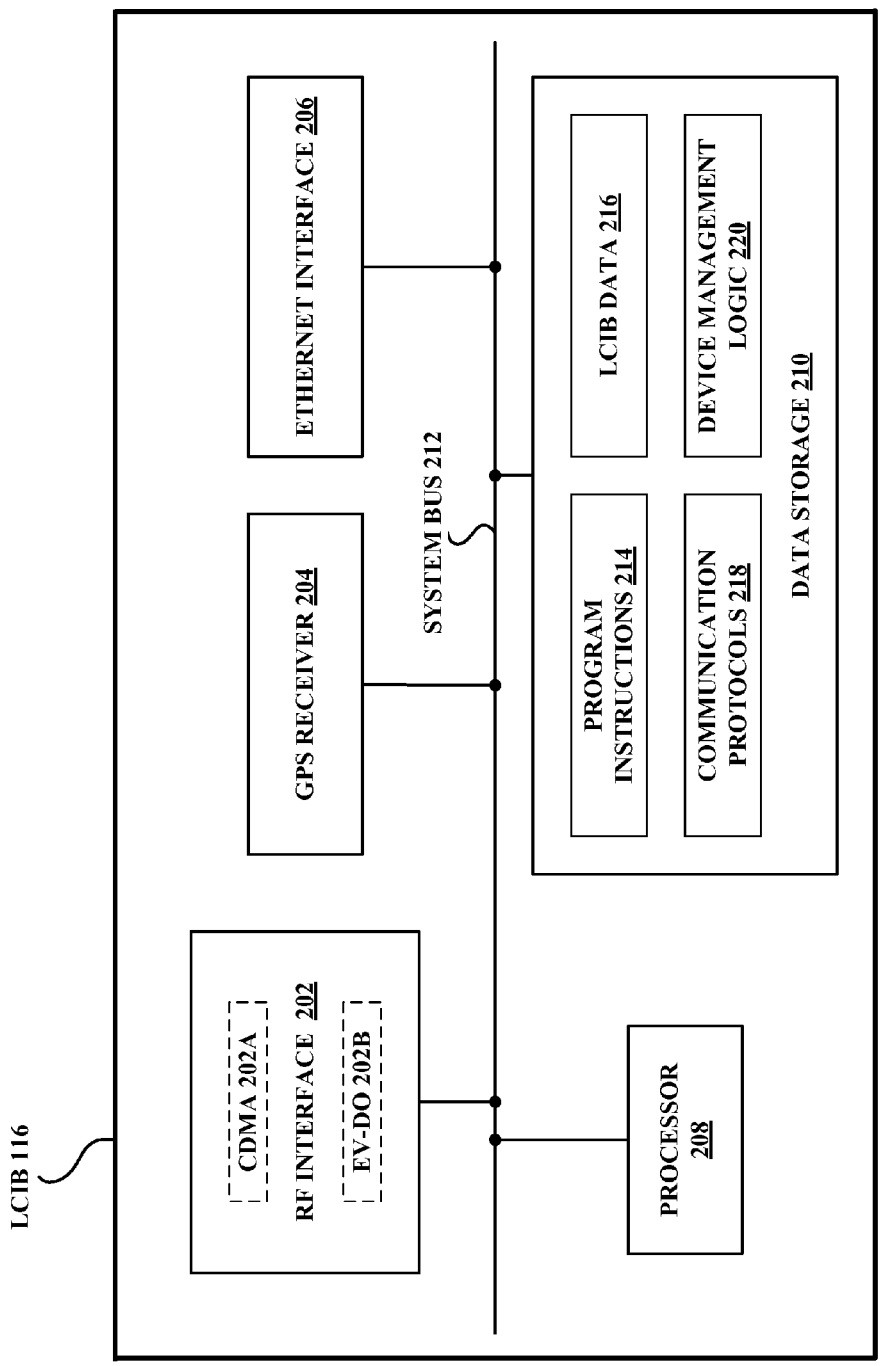
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 generally functions to interface between one or more wireless networks that employ one or more wireless technologies (CDMA, EV-DO, GSM, WiMax, etc.) and the other components of LCIB 116. In particular, in this embodiment, RF interface 202 is depicted as including a CDMA interface 202A and an EV-DO interface 202B. Note that these protocols could be reversed, and either or both could be replaced with any suitable wireless protocol.

CDMA interface 202A may include one or more antennas, one or more chipsets, one or more channel elements, and/or one or more other components suitable for providing a CDMA wireless coverage area that LCIB 116 bridges to Ethernet interface 206 as a backhaul connection over Internet 114 to service-provider network 110, perhaps involving a VPN connection over Internet 114 with VPN-terminator 120. EV-DO interface 202B may be or include one or more antennas, one or more chipsets, and/or any other suitable components for acting as an EV-DO access terminal capable of establishing a packet-data session with EV-DO network 126.

GPS receiver 204 may be any known or hereafter developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor.

The data storage 210 may take various forms, in one or more parts, such as a non-volatile storage block and/or a removable storage medium, and may include (a) program instructions 214 executable by processor 208 for carrying out the LCIB functions described herein (such as using CDMA interface 202A to provide service to mobile stations, bridging CDMA interface 202A and Ethernet interface 206; collecting operational data; and using EV-DO interface 202B to transmit the operational data to operational-data server 128 over EV-DO network 126), (b) LCIB data 216, which may be any operational data or other type of data stored by LCIB 116, (c) communication protocols 218, facilitating and enabling communication with one or more other devices, and (d) device management logic 220, perhaps for memory and file management.

3. Exemplary Operation a. A First Exemplary Method

Figure 3:
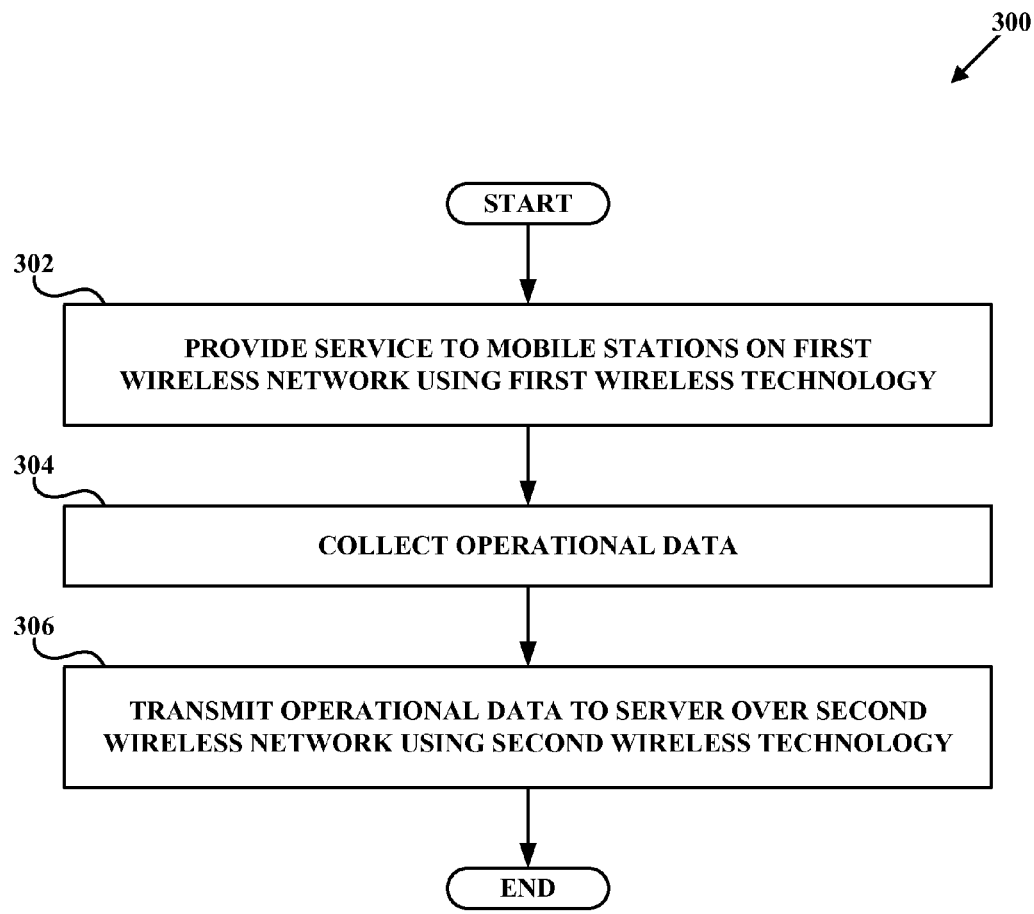
FIG. 3 is a flowchart of a method, in accordance with exemplary embodiments.

FIG. 3 depicts a flowchart of an exemplary method, in accordance with an exemplary embodiment. In particular, FIG. 3 depicts a method 300, which begins at step 302, when LCIB 116 provides service to at least one mobile station on a first wireless network, wherein providing service on the first wireless network comprises (i) providing an air interface according to a first wireless technology, (ii) providing a backhaul connection over a packet-data network to a service-provider network, and (iii) bridging the air interface and the backhaul connection.

At step 304, LCIB 116 collects operational data. At step 306, LCIB 116 transmits the operational data to operational-data server 128 over a second wireless network according to a second wireless technology, where the second wireless network is different than the first wireless network, and the second wireless technology is different than the first wireless technology.

These steps are further explained in the following subsections. And it should be noted that, although method 300 is described as being carried out by LCIB 116, this is not required. In some embodiments, method 300 may be carried out by LCIB 116 in cooperation with one or more other network entities, such as VPN terminator 120, LCIB controller 122, and operational-data server 128. In general, method 300 could be carried out by any one or any combination of network elements described herein, or any other element(s).

i. Provide Service to Mobile Stations on First Wireless Network

At step 302, LCIB 116 provides service to at least one mobile station on a first wireless network. In an exemplary embodiment, the first wireless network is a CDMA network provided by the operator of service-provider network 110. Thus, the CDMA network may include a macro network with elements such as BTS 104 and BSC 106, as well as including LCIB 116. LCIB 116 uses CDMA interface 202A to provide a CDMA air interface. LCIB then uses processor 208 and system bus 212, among other components, to bridge CDMA interface 202A with Ethernet interface 206, and thus provide mobile stations operating on LCIB 116's CDMA air interface to communicate over a backhaul connection that may involve a VPN connection over Internet 114 between LCIB 116 and VPN-terminator 120.

ii. Collect Operational Data

At step 304, LCIB 116 collects operational data, which may include one or more data values related to a number of dropped calls, a number of blocked calls, an amount of data throughput, an access-quality metric (e.g. signal strength), a voice-quality metric (e.g. frame error rate), an auto-configuration parameter, and/or any other suitable operational measurement or record. The operational data may also include any sort of average, summary, report, or other compilation or distillation of operational-data values. This data may be collected periodically, automatically, in response to commands from an entity such as LCIB controller 122, in response to a user command, and/or in any other manner or in response to any other trigger, without departing from the scope and spirit of the present invention.

iii. Transmit Operational Data to Server via Second Wireless Network

At step 306, LCIB 116 transmits the operational data—collected in step 304—to operational-data server 128 over EV-DO network 126 using an EV-DO packet-data session that LCIB 116 establishes with EV-DO network 126 (such as with an access node therein). Note that EV-DO network 126 may be operated by the same business entity that operates the CDMA network associated with service-provider network 110, or may be operated by some third party. Operational-data server 128 may reside on service-provider network 110, such as on that network's core packet network, or on some other network, perhaps accessible via Internet 114. Note as well that operational-data server 128 could be a collection of servers, a functional entity of another computing device, and/or any other suitable implementation.

Step 306 may involve transmitting operational data to operational-data server 128 on a periodic basis, such as once every 24 hours. As such, a low-traffic time of day such as 2:00 or 3:00 a.m. may be advantageously selected. However, the data may be submitted more than or less than once per day, such as every 12 hours, once a week, or according to any other period. Furthermore, LCIB 116 may determine whether it receives an acknowledgement of each operational-data transmission from operational-data server 128. If such an acknowledgment is received within a suitable timeout period, then LCIB 116 may simply be satisfied to wait until the next period passes to send the next round of operational data to operational-data server 128. If the acknowledgment is not received within the timeout period, however, then LCIB 116 may retransmit the operational data one or more times until receiving an acknowledgement, perhaps up to some upper bound of attempts to be made.

In some embodiments, LCIB 116 may, prior to transmitting the operational data to operational-data server 128 via EV-DO network 126, estimate the load on EV-DO network 126: if the load is low, LCIB 116 may go forward with the operational-data transmission; if not, then LCIB 116 may wait. In particular, LCIB 116 may estimate whether the load on EV-DO network 126 (perhaps on the given sector/carrier on which LCIB 116's EV-DO interface 202B is operating) is less than a threshold level of load.

One way to do this is to check the RAB on the sector/carrier. Recall that the RAB is a bit broadcast by EV-DO access terminals to indicate whether the reverse noise (a proxy for load) on a sector/carrier is above (RAB=1) or below (RAB=0) a given reverse-activity threshold. LCIB 116 may go ahead with the operational-data transmission if the RAB is clear (=0), and not go ahead if the RAB is set (=1). LCIB 116 may also wait to make an operational-data transmission if EV-DO network 126 is unavailable at the time LCIB 116 would otherwise transmit the operational data.

Thus, LCIB 116 may be programmed to wait until EV-DO network 126 is available and experiencing a below-threshold load, prior to transmitting the data. In rare instances, EV-DO network 126 may be unavailable or heavily loaded for an extended period of time. Once LCIB 116 detects that such a threshold period of time has passed, LCIB 116 may use its backhaul connection via Ethernet interface 206 (and perhaps its user's cable-modem connection) to transmit operational data to operational-data server 128. LCIB 116 may still avoid using the VPN connection to VPN-terminator 120, and may instead address packets to, for example, a public IP interface of operational-data server 128.

b. A Second Exemplary Method

Figure 4:
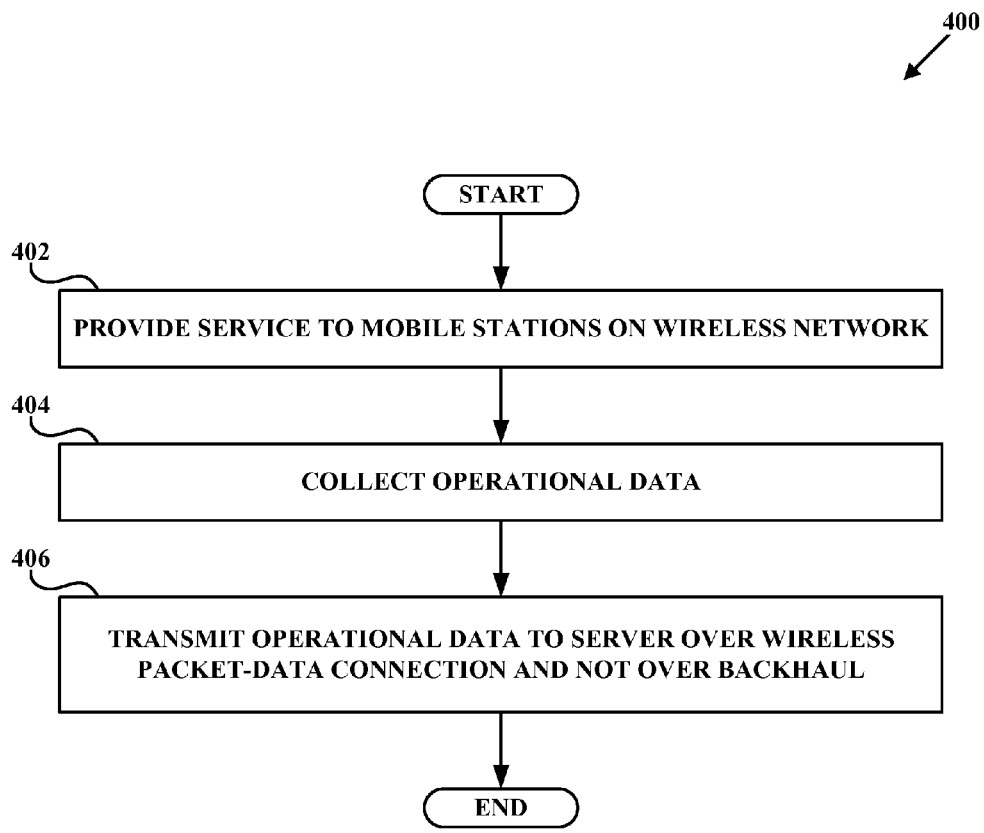
FIG. 4 is a flowchart of a method, in accordance with exemplary embodiments.

FIG. 4 is a flowchart of a second exemplary method, in accordance with an exemplary embodiment. In particular, FIG. 4 depicts a method 400, which may be carried out by an LCIB, such as LCIB 116, or perhaps by an LCIB in cooperation with one or more other entities, such as VPN terminator 120, LCIB controller 122, and/or operational-data server 128. Method 400 is similar in some respects to method 300, and thus is not described in as great of detail.

As shown in FIG. 4, method 400 begins at step 402, when LCIB 116 provides service to at least one mobile station on a wireless network. This involves (i) providing an air interface (e.g. a CDMA air interface), (ii) providing a backhaul connection (e.g. by way of Ethernet interface 206) over a packet-data network (e.g. Internet 114) to a service-provider network (e.g. service-provider network 110), and (iii) bridging the air interface and the backhaul connection. At step 404, LCIB 116 collects operational data, which may include one or more of the examples of operational data listed herein, and/or any other suitable examples of operational data.

At step 406, LCIB 116 transmits the operational data to an operational-data server (e.g. operational-data server 128) over a wireless packet-data connection and not over the backhaul connection. Note that the wireless packet-data connection could utilize (i) the same wireless network/technology (i.e. CDMA) on which LCIB 116 provides service or (ii) a wireless network/technology (i.e. EV-DO) other than that on which LCIB 116 provides service.

CONCLUSION

Various exemplary embodiments have been described above. Those skilled in the art will understand, however, that changes and modifications may be made to those examples without departing from the scope of the claims.

The invention claimed is:

1. A method carried out by a low-cost Internet base station (LCIB) that has a backhaul connection over a packet-data network to a service-provider network, the method comprising:
the LCIB providing wireless service to at least one mobile station on a first wireless network, wherein providing wireless service on the first wireless network comprises (i) providing an air interface according to a first wireless technology and (ii) bridging the air interface and the backhaul connection;
the LCIB collecting operational data pertaining to the wireless service that the LCIB provides to the at least one mobile station on the first wireless network according to the first wireless technology; and
the LCIB transmitting the operational data to an operational-data server over a second wireless network according to a second wireless technology, wherein the second wireless network is different than the first wireless network, and wherein the second wireless technology is different than the first wireless technology,
wherein the LCIB transmits the operational data to the operational-data server in a manner that does not involve the LCIB transmitting the operational data to the operational-data server via the backhaul connection,
wherein transmitting the operational data to the operational-data server comprises transmitting the operational data in response to estimating a load on the second wireless network to be less than a threshold level, and
wherein estimating the load on the second wireless network to be less than the threshold level comprises determining that a reverse activity bit (RAB) is cleared.

2. The method of claim 1, wherein a nearby macro network also provides service on the first wireless network according to the first wireless technology.

3. The method of claim 2, wherein the nearby macro network comprises a core packet network, and wherein the operational-data server resides on the core packet network.

4. The method of claim 2, wherein the nearby macro network comprises a core packet network, and wherein the operational-data server does not reside on the core packet network.

5. The method of claim 1, wherein a nearby macro network provides service on the second wireless network according to the second wireless technology.

6. The method of claim 1, wherein the first wireless technology is code division multiple access (CDMA).

7. The method of claim 1, wherein the second wireless technology is Evolution Data Optimized (EV-DO).

8. The method of claim 1, wherein the packet-data network comprises the Internet.

9. The method of claim 1, wherein the operational data comprises at least one of a number of dropped calls, a number of blocked calls, an amount of data throughput, an access-quality metric, a voice-quality metric, an auto-configuration parameter, an average, a summary, and a report.

10. The method of claim 1, wherein transmitting the operational data to the operational-data server over the second wireless network according to the second wireless technology comprises establishing a packet-data session with the second wireless network.

11. The method of claim 1, wherein the LCIB transmitting the operational data to the operational-data server comprises the LCIB retransmitting the operational data to the operational-data server if the LCIB does not receive an acknowledgement from the operational-data server within a timeout period.

12. The method of claim 1, further comprising the LCIB transmitting operational data to the operational-data server via the backhaul connection in response to at least one of the following conditions prevailing for at least a threshold amount of time: (i) the load on the second wireless network exceeding the threshold level and (ii) the second wireless network being unavailable.

13. A low-cost Internet base station (LCIB) comprising:
a code division multiple access (CDMA) interface;
an Evolution Data Optimized (EV-DO) interface;
a backhaul connection over a packet-data network to a service provider network;
a processor; and
data storage comprising instructions executable by the processor to:
use the CDMA interface to provide wireless service to at least one mobile station on a CDMA network, wherein providing wireless service on the CDMA network comprises bridging the CDMA interface and the backhaul connection;
collect operational data pertaining to the wireless service that the LCIB provides to the at least one mobile station on the CDMA network; and
use the EV-DO interface to transmit the operational data to an operational-data server over an EV-DO network,
wherein the LCIB transmits the operational data to the operational-data server in a manner that does not involve the LCIB transmitting the operational data to the operational-data server via the backhaul connection,
wherein transmitting the operational data to the operational-data server comprises transmitting the operational data in response to estimating a load on the EV-DO network to be less than a threshold level, and
wherein estimating the load on the EV-DO network to be less than the threshold level comprises determining that a reverse activity bit (RAB) is cleared.

* * * * *